Dec. 24, 1963 L. L. MORSE 3,115,382

RECTILINEAR RECORDING STYLUS

Filed Oct. 2, 1962

INVENTOR.
LEIGHTON L. MORSE

BY

ATTORNEYS

United States Patent Office 3,115,382
Patented Dec. 24, 1963

3,115,382
RECTILINEAR RECORDING STYLUS

Leighton L. Morse, San Diego, Calif., assignor to the United States of America as represented by the Secretary of the Navy Filed Oct. 2, 1962, Ser. No. 227,963
7 Claims. (Cl. 346—114)
(Granted under Title 35, U.S. Code (1952), sec. 266)

The invention described herein may be manufactured and used by or for the Government of the United States of America for governmental purposes without the payment of any royalties thereon or therefor.

The invention pertains to a stylus and its associated supporting apparatus which are particularly adapted for use in the art of direct-writing recording.

Many of the direct-writing, ink-pen recorders must employ curvilinear coordinates because the pen movement follows a curve rather than a straight line. A few ink-pen recorders are rectilinear recording, however, they are undesirable as they employ capillary-action pens and complicated, multiple-pivot mechanical linkages to support the pens.

It is an object of the present invention to provide a new and improved recorder stylus.

It is an object of the present invention to provide a new and improved stylus for use in a direct-writing recorder.

Another object of the invention is to provide a stylus for producing a trace on a movable recording media wherein said stylus movement is rectilinear.

It is a feature of the present invention to provide a ball point recording stylus with magnetic means for directing the motion of the stylus with respect to the recording media.

Other objects and features of the invention will be apparent from a study of the following specifications, read in connection with the accompanying drawings, wherein.

Figures 1, 2:
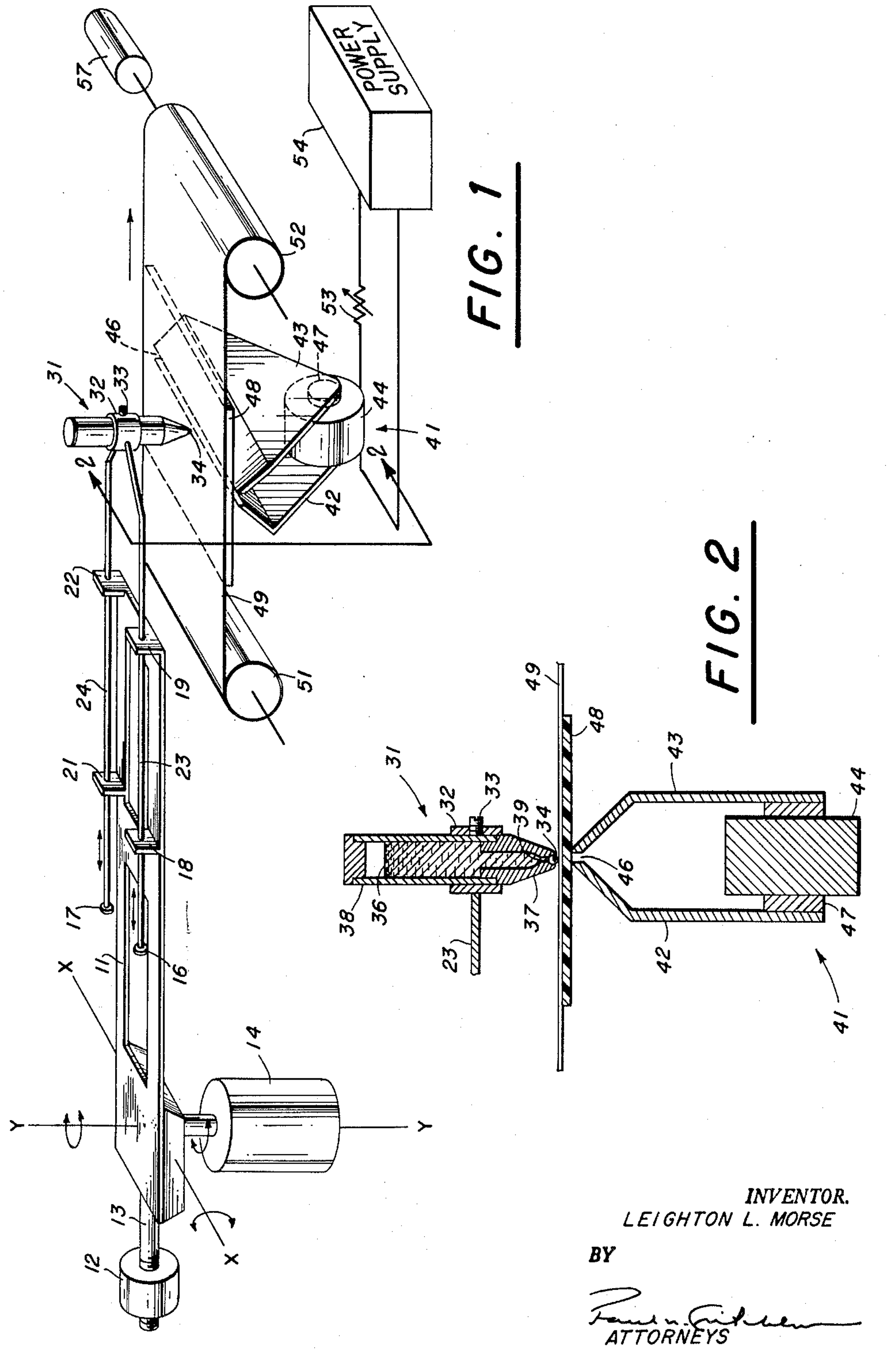
FIG. 1 is a perspective view of a recording stylus in accordance with the present invention.
FIG. 2 is an enlarged sectional view taken along line 2—2 of FIG. 1.

It will be apparent that the stylus and supporting apparatus of the present invention have many applications. For the purpose of illustrating the invention, however, the invention has been shown in FIG. 1 as applied to recording apparatus employing a vertically-situated rotary driving means.

The apparatus of FIG. 1 is equipped with rigid arm 11 free to pivot vertically about axis *x—x* and horizontally about axis *y—y*. Threaded counterweight 12 is free to move longitudinally on threaded section 13 of arm 12. Arm 11 is driven clockwise and counter-clockwise in accordance with data to be recorded about axis *y—y* by means of transducer 14 which may be any one of the conventional recorder rotary drivers, for example, a galvanometer.

Collar 32 is firmly attached to and supported by rods 23 and 24. Rods 23 and 24 slidably engage in guides 18, 19, 21 and 22 and are free to simultaneously move longitudinally with respect to arm 11. Stops 16 and 17 at the ends of rods 23 and 24, respectively, prevent the rods from sliding out of guides 18 and 21, respectively. Ball point pen 31 is secured within collar 32 by means of set screw 33 and disposed so as to enable rotatable ball 34 to travel on recording media 49 and leave a continuous trace thereon. Recording media 49, which may be, for example, paper, is transported from roller 51 to roller 52. Driving means 57, which may be, for example, a motor, rotates roller 52 and moves the recording media under pen 31.

Under pen 31, the recording media 49 is supported by thin platen 48 which is preferably made of a non-magnetic matreial such as brass or plastic. Disposed under platen 48 is an electromagnet 41 comprising coil 44, core 47 and pole pieces 42 and 43. The coil 44 is wound about cylindrical core 47 and partially disposed between fan-shaped pole pieces 42 and 43 which are joined to the opposite ends of core 47, respectively. The uppermost edges of the pole pieces extend to at least the width of the recording media. The upper ends of the pole pieces are bent toward each other so as to form a narrow, linear gap 46. The electromagnet is oriented so that gap 46 is perpendicular to recording media 49. The current for coil 44 is supplied by power supply 54 and controlled by rheostat 53. The core 47 and pole pieces 42 and 43 are made of magnetic material, for example, soft iron. In operation, a magnetic field is continuously produced at gap 46 and the strength of the field is controlled by adjusting rheostat 53.

FIG. 2 is an enlarged sectional view taken along line 2—2 of FIG. 1. Cylinder 38 of pen 31 is joined to barrel 37 and held in collar 32 by means of set screw 33. A writing ball 34 is retained in the lower end of barrel 37 in a freely rotatable manner. Paste type ink 36 contained within cylinder 38 and barrel 37 reaches ball 34 through metering orifice 39. Cylinder 38 is preferably transparent to enable the operator to monitor the ink supply within the pen. Ball 34 and/or barrel 37 are made of a magnetic material, for example, steel, so that the lower end of the pen 31 will be attracted to the magnetic flux in linear air gap 46 of electromagnet 41.

In operation, transducer 14 moves arm 11 in a clockwise or counter-clockwise motion about axis *y—y* in accordance with data to be recorded on recording media 49. Writing ball 34 riding on media 49 continuously leaves an ink trace as it traverses the media. As arm 11 pivots about axis *y—y*, the radius between pen 31 and axis *y—y* is free to vary as pen-support rods 23 and 24 slidably engage in guides 18, 19, 21 and 22. Due to the magnetic attraction between the electromagnet 41 and the magnetic material at the lower end of the pen, the writing ball is always held directly over linear gap 46. As the gap is perpendicular to the recording media, rectilinear recording is effected at all times. The pen pressure on recording media 49 is controlled by adjusting counterweight 12 and rheostat 53. Of course, the magnetic field produced by electromagnet 41 must always be sufficient to keep the writing ball 34 in the linear path defined by gap 46. It should be appreciated that electromagnet 41 can be replaced with a permanent magnet having pole pieces similar to pole pieces 42 and 43.

It will be understood that there has been provided a recording stylus capable of rectilinear recording which employs one straight arm rather than a multi-joint, multi-pivot, non-linear arm and which further employs an easily replaceable pen causing a writing fluid which cannot be spilled and which does not have disadvantages of the capillary-action pen used heretofore.

Since many modifications and variations of the embodiment shown are possible in the light of the above teaching, it is to be understood that within the scope of the appended claims the invention may be practiced otherwise than as specifically described.

What is claimed is:

1. In combination:

an elongated member pivotable about an axis *y—y*, said member having a collar fastened at the extremity removed from said axis;

a platen;

a recording media in juxtaposition with said platen;

a pen, a portion of said pen being magnetic, said pen being fastened to said collar and adapted to make a trace on said recording media;

magnetic means adjacent said platen for attracting said pen and confining the motion of said pen to a linear path.

2. Rectilinear recording apparatus comprising:

a recording media;

a platen adjacent a portion of said media;

an elongated arm having a longitudinal axis *z*, said arm being pivotable about axis *y—y* perpendicular to axis *z*;

an elongated extension member having a collar fastened to one extremity thereof, said member being attached to said arm and free to slide along said axis *z* of said arm changing the distance between said axis *y—y* and said collar;

a pen fastened to said collar, said pen in contact with said media next to said platen and adapted to scribe a trace on said media, at least a portion of said pen being magnetic;

magnetic means facing said platen, said media and said pen, respectively, for confining the travel of said pen to a linear path on said media.

3. Recording apparatus comprising:

a recording media;

a platen backing a portion of said media;

an elongated member pivotable about axis *y—y*, said member having a pen fastened to one extremity thereof, the length of said member between said axis and said pen being adjustable, said pen being disposed on said platen-backed portion of said media and adapted to scribe a trace on said media, means connected to said member for rotating said member clockwise and counter-clockwise about said axis in accordance with data to be recorded;

magnetic means adjacent to said platen and facing said platen, said media and said pen, respectively, for confining the travel of said pen to a linear path on said media:

4. Recording apparatus comprising:

a recording media;

a platen backing a portion of said media;

an elongated member pivotable about axis *y—y*, said member having a pen fastened to one extremity thereof, the length of said member between said axis and said pen being adjustable, said pen being disposed on said platen-backed portion of said media and adapted to scribe a trace on said media, magnetic means adjacent to said platen and facing said platen, said media and said pen, respectively, for confining the travel of said pen to a linear path on said media.

5. Apparatus for direct-writing rectilinear recording comprising in combination the following elements:

(*a*) an arm free to pivot about two axes which are perpendicular to each other;

(*b*) means coupled to (*a*) for moving (*a*) about one of said axes in accordance with data to be recorded;

(*c*) first and second rods;

(*d*) a collar fastened to one end of said rods; said other ends of said rods slidably engaged with said arm;

(*e*) a platen;

(*f*) a recording media supported by (*e*);

(*g*) a ball point pen having a rotatable writing ball, a portion of said pen being magnetic, said ball being in contact with said recording media;

(*h*) and magnetic means in juxtaposition with the said platen for attracting said pen and confining its motion to a linear path.

6. Apparatus for rectilinear, direct-writing recording comprising:

an elongated member pivotable about axes *x—x* and *y—y* which are perpendicular to each other, said member having an adjustable counterweight at one extremity, said member having a collar at the other extremity, the radius of said member between said axis *y—y* and said collar being adjustable;

means connected to said member for pivoting said member about said axis *y—y* in accordance with data to be recorded;

a recording media;

a platen adjacent to a portion of said media;

a ball point pen with a rotatable, magnetic writing ball fastened to said collar, said ball contacting said media and adapted to scribe a trace thereon;

magnetic means for controlling the track of the pen on the media, said controlled track being linear.

7. Apparatus for rectilinear, direct-writing recording comprising:

an elongated member pivotable about axes *x—x* and *y—y* which are perpendicular to each other, said member having an adjustable counterweight at one extremity, said member having a collar at the other extremity, the radius of said member between said axis *y—y* and said collar being adjustable;

a recording media;

a platen adjacent to a portion of said media;

a ball point pen with a rotatable, magnetic, writing ball fastened to said collar, said ball contacting said media and adapted to scribe a trace thereon;

magnetic means disposed adjacent the platen for controlling the track of the pen on the media, said controlled track being linear.

References Cited in the file of this patent

UNITED STATES PATENTS

| | | |
|---|---|---|
| 1,869,044 | Bousch | July 26, 1932 |
| 2,442,586 | Clark | June 1, 1948 |

FOREIGN PATENTS

| | | |
|---|---|---|
| 21,935 | Great Britain | Oct. 12, 1903 |